(12) United States Patent
Ando

(10) Patent No.: US 10,534,905 B2
(45) Date of Patent: Jan. 14, 2020

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Keita Ando, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/976,476

(22) Filed: May 10, 2018

(65) Prior Publication Data

US 2018/0341765 A1 Nov. 29, 2018

(30) Foreign Application Priority Data

May 26, 2017 (JP) .................. 2017-104945

(51) Int. Cl.

| | | |
|---|---|---|
| *G06F 15/00* | (2006.01) | |
| *G06F 21/41* | (2013.01) | |
| *H04W 12/06* | (2009.01) | |
| *G06F 3/12* | (2006.01) | |
| *G06F 21/60* | (2013.01) | |
| *H04L 29/06* | (2006.01) | |

(52) U.S. Cl.
CPC ............ *G06F 21/41* (2013.01); *G06F 3/1204* (2013.01); *G06F 3/1222* (2013.01); *G06F 3/1231* (2013.01); *G06F 3/1238* (2013.01); *G06F 3/1271* (2013.01); *G06F 21/608* (2013.01); *H04L 63/0815* (2013.01); *H04W 12/06* (2013.01)

(58) Field of Classification Search
CPC ...... G06F 21/41; G06F 3/1231; G06F 3/1238; G06F 3/1222; H04W 12/06
USPC ........................................ 358/1.14
See application file for complete search history.

(56) References Cited

U.S. PATENT DOCUMENTS

2014/0300920 A1* 10/2014 Hayashi ............. H04N 1/00413
  358/1.14
2015/0220826 A1* 8/2015 Mori ..................... G06F 3/1203
  358/1.15

FOREIGN PATENT DOCUMENTS

| JP | 2004122778 A | 4/2004 |
|---|---|---|
| JP | 2015022409 A | 2/2015 |

* cited by examiner

*Primary Examiner* — Saeid Ebrahimi Dehkordy
(74) *Attorney, Agent, or Firm* — Rossi, Kimms & McDowell LLP

(57) ABSTRACT

An image processing apparatus, if a login application (login app) is enabled, performs setting of an authentication function (authentication transmission) of a transmission application (transmission app). The image processing apparatus performs an ON or OFF setting of the authentication function (authentication transmission) which has a handover function for receiving authentication information, used for authentication by another application, that is handed over from the other application and using the handed over authentication information. The image processing apparatus, in accordance with the login app being enabled, by setting the authentication transmission of the transmission app to ON, enables handover by the handover function of authentication information used by the login app to the transmission app.

15 Claims, 5 Drawing Sheets

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

An image processing apparatus that has a login function (a device login function) in which login authentication for a user is performed to restrict functions whose use is permitted on a user by user basis is commonly known (Japanese Patent Laid-Open No. 2004-122778 and Japanese Patent Laid-Open No. 2015-22409). In an image processing apparatus in which arbitrarily applications can be caused to operate on firmware, it is possible to realize such a login function by an application that operates on firmware.

Also, there are cases in which, for each function (application) that an image processing apparatus has, the user that uses that function is authenticated (Japanese Patent Laid-Open No. 2015-22409). For example, upon authenticating the user that uses a transmission function (transmission application), an email address or a save destination corresponding to the user is used as an image data transmission destination. In such a case, by handing over, from the device login function to the transmission function, the authentication information (user name, password, or the like) used in the login authentication, it becomes possible to use authentication information that the user inputted when logging into the image processing apparatus for authentication according to the transmission function.

There are the following problems in a case where a login application that realizes the login function as described above is later installed on the image processing apparatus as an application that operates on firmware. Specifically, in the case where the authentication information used in the login authentication is used in a handover from the login application to another application, it may be necessary that the login application have a handover function that realizes such a handover. However, in a case where there is already a handover function in another application such as a transmission application that was installed beforehand on the image processing apparatus, the implementation of the handover function in the login application may be redundant.

SUMMARY OF THE INVENTION

The present invention was conceived in view of the above described issues. The present invention provides a technique that enables, in an image processing apparatus, handover of authentication information to a transmission application without implementation of an authentication information handover function in a login application for user login authentication.

According to one aspect of the present invention, there is provided an image processing apparatus comprising: a memory device that stores a set of instructions; and at least one processor that executes the set of instructions to: enable a first application configured to authenticate a user who logs into the image processing apparatus; and perform, as a setting corresponding to a second application configured to transmit image data to an external apparatus, an ON or OFF setting of an authentication function for authenticating a user who uses the second application, the authentication function having a handover function for receiving authentication information, used for authentication by another application, that is handed over from the another application and then using the handed over authentication information, wherein the at least one processor executes instructions in the memory device to, by setting the authentication function to ON in accordance with the first application being enabled, enable handover by the handover function of the authentication information used by the first application to the second application.

According to another aspect of the present invention, there is provided a method of controlling an image processing apparatus, the method comprising: enabling a first application configured to authenticate a user who logs into the image processing apparatus; and performing, as a setting corresponding to a second application configured to transmit image data to an external apparatus, an ON or OFF setting of an authentication function for authenticating a user who uses the second application, the authentication function having a handover function for receiving authentication information, used for authentication by another application, that is handed over from the another application and then using the handed over authentication information, wherein in the setting, by setting the authentication function to ON in accordance with the first application being enabled, handover by the handover function of the authentication information used by the first application to the second application is enabled.

According to still another aspect of the present invention, there is provided a non-transitory computer-readable storage medium storing a computer program for causing a computer to execute a method of controlling an image processing apparatus, the method comprising: enabling a first application configured to authenticate a user who logs into the image processing apparatus; and performing, as a setting corresponding to a second application configured to transmit image data to an external apparatus, an ON or OFF setting of an authentication function for authenticating a user who uses the second application, the authentication function having a handover function for receiving authentication information, used for authentication by another application, that is handed over from the another application and then using the handed over authentication information, wherein in the setting, by setting the authentication function to ON in accordance with the first application being enabled, handover by the handover function of the authentication information used by the first application to the second application is enabled.

By virtue of the present invention, it becomes possible, in an image processing apparatus, to perform a handover of authentication information to a transmission application without implementation of an authentication information handover function in a login application for user login authentication.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<MFP Hardware Configuration>

Figure 1:
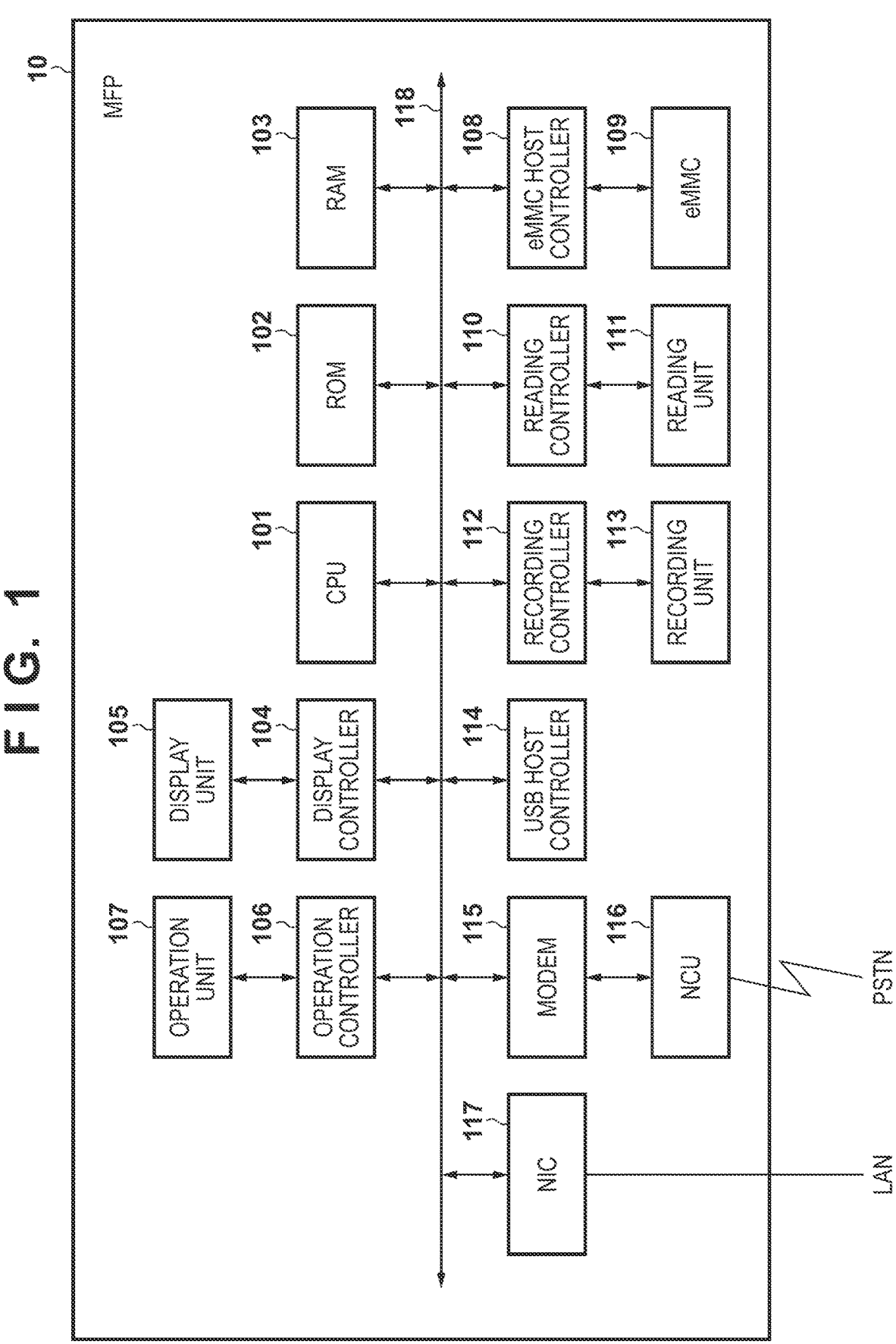
FIG. 1 is a block diagram that illustrates a hardware configuration of an MFP.

FIG. 1 is a block diagram illustrating a hardware configuration of an MFP 10 (image processing apparatus) according to an embodiment of the present invention. The MFP 10 comprises a CPU 101, a ROM 102, a RAM 103, a display controller 104, an operation controller 106, an eMMC (embedded multimedia card) host controller 108, a reading controller 110, a recording controller 112, a USB host controller 114, a modem 115, and an NIC (network interface card) 117, and these devices are connected to a system bus 118. The MFP 10 further comprises a display unit 105, an operation unit 107, an eMMC 109, a reading unit 111, a recording unit 113, and an NCU (network control unit) 116.

The CPU 101 controls each device connected to the system bus 118. The CPU 101 is supplied with power from a power supply, and by executing a boot program stored in the ROM 102, loads a main program (firmware) stored in a storage (the eMMC 109) into the RAM 103. The CPU 101 executes the main program loaded into the RAM 103. The RAM 103 not only functions as a storage region into which the main program is loaded, but also functions as a work area for the main program. In the present embodiment, the eMMC 109 is used as a storage of the MFP 10. The CPU 101 accesses the eMMC 109 via the eMMC host controller 108. The CPU 101, as described later, realizes the processing illustrated in FIG. 4 to FIG. 6 by reading a control program stored in the ROM 102 or the eMMC 109 and executing the control program.

The display controller 104 is connected to the display unit 105, and controls screen display by the display unit 105. The display unit 105 may be configured by an LCD (liquid crystal display). The operation controller 106 is connected to the operation unit 107, and controls input from the operation unit 107. The operation unit 107 may be configured by a touch panel arranged on the display unit 105.

The reading unit 111 reads an original image to generate image data. The reading unit 111 may comprise an automatic document feeder (not shown graphically) for enabling automatic reading of a plurality of original images. The recording unit 113 forms an image on a sheet (a recording medium) by an electrophotographic method, for example. The CPU 101 communicates with the reading unit 111 via the reading controller 110, and communicates with the recording unit 113 via the recording controller 112.

The USB host controller 114, in the case where a USB device such as a USB memory (not shown graphically) is connected to the MFP 10, controls access to the connected USB device. The modem 115 is connected to the NCU 116 and performs modulation and demodulation of signals for facsimile (FAX) communication. A signal that was modulated by the modem 115 is transmitted to the public line network (PSTN) via the NCU 116. The NIC 117 performs communication with an external apparatus via a network such as a LAN.

<MFP Software Configuration>

Figure 2:
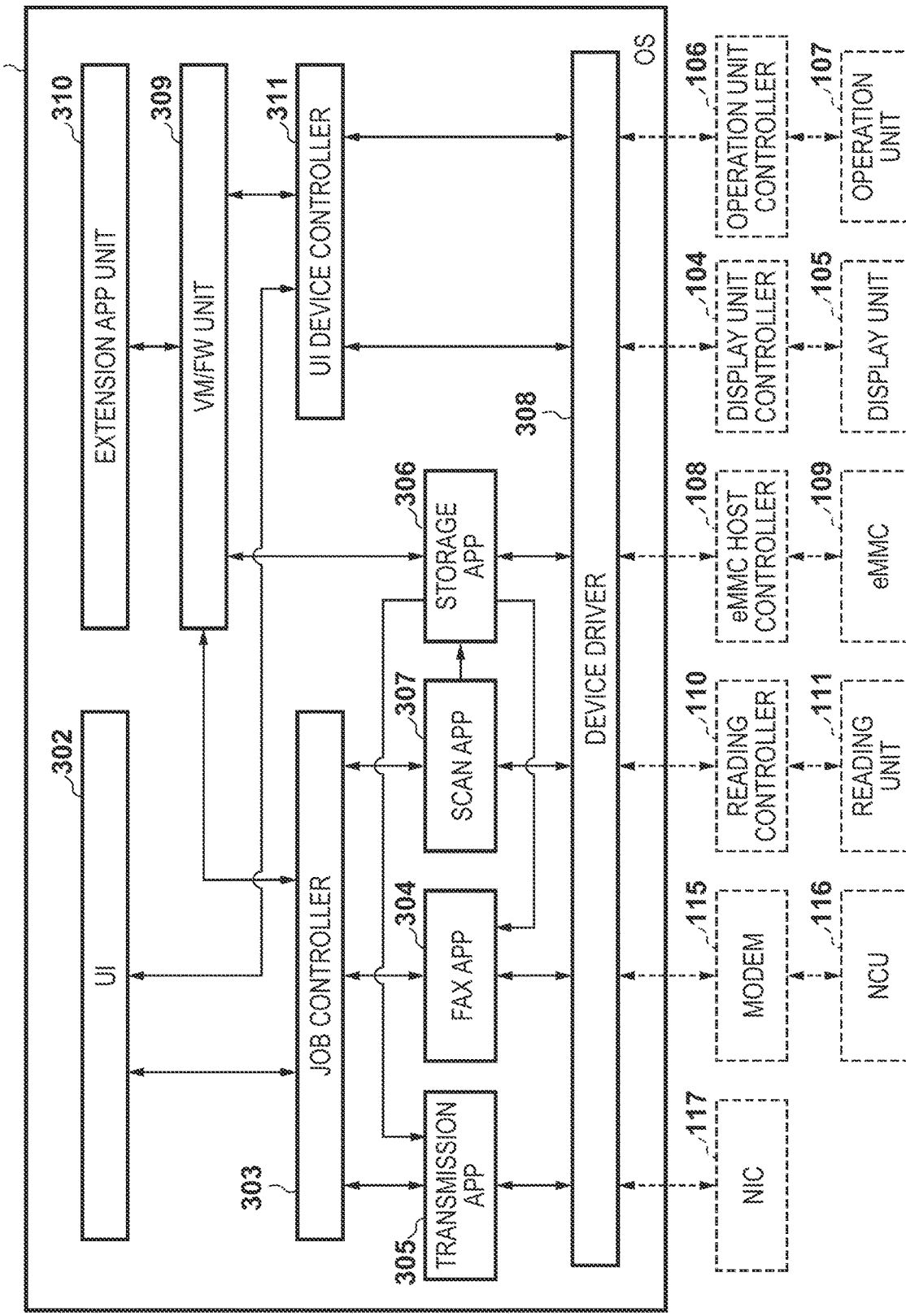
FIG. 2 is a block diagram that illustrates a software configuration of an MFP.

FIG. 2 is a block diagram illustrating a software configuration of the MFP 10. By the CPU 101 executing a main program that was loaded into the RAM 103, each software module (application) illustrated in solid lines in FIG. 2 operates on the MFP 10. An OS (operating system) 301 manages and controls execution of each software module (application) 302 to 311 described below. Note that applications other than the applications installed in the extension application (extension app) unit 310 illustrated in FIG. 2 are native applications (native apps) installed in advance in the MFP 10.

A device driver 308 is embedded in the OS 301. The device driver 308 controls devices such as the display controller 104, the operation controller 106, the reading controller 110, and the like and functions as an interface between each application (app) and each device. A UI (user interface) 302 provides to the user various information via the display unit 105, and receives various instructions from the user via the operation unit 107.

A job controller 303 receives jobs such as a copy job, a print job, a FAX job, or the like, and controls execution of the received job. A transmission app 305 is application software for performing data transmission via a network such as a LAN. A FAX app 304 is application software for performing FAX transmission and reception via a PSTN. A scan app 307 is application software for performing reading (scanning) of an original image. A storage app 306 is application software for performing writing of data to a storage (the eMMC 109) or reading of data from a storage. For example, the storage app 306 stores various data such as image data, user settings, or the like in the eMMC 109.

The job controller 303 controls execution of the received job by using the FAX app 304, the transmission app 305, and the scan app 307. For example, in a case where a FAX job for transmitting FAX data to the external apparatus is received in the MFP 10 of the present embodiment, the job controller 303 controls execution of the FAX job by using the scan app 307 and the FAX app 304.

Specifically, the job controller 303 causes the scan app 307 to execute a scan of an original image by the reading unit 111. The scan app 307 generates image data by scanning an original image by the reading unit 111, and stores the generated image data in the eMMC 109 via the storage app 306. Furthermore, the job controller 303 causes the FAX app 304 to execute a fax transmission of image data stored in the eMMC 109. The FAX app 304 reads the image data stored in the eMMC 109 via the storage app 306, and transmits the read image data, as FAX data, to a predetermined destination via the modem 115 and the NCU 116.

The MFP 10 of the present embodiment further comprises a VM (virtual machine)/FW (framework) unit 309 and the extension app (application) unit 310. Applications for functional extension of the MFP 10 may be additionally installed in the extension app (application) unit 310. An application program installed in the extension app unit 310 may be defined using any programming language. For example, the VM/FW unit 309 installs applications in the extension app unit 310, and uninstalls applications that were installed in the extension app unit 310. In the present embodiment, a login application (login app) (for performing user login authentication) that authenticates a user that logs into the MFP 10 is installed in the extension app unit 310.

The VM/FW unit 309 can perform adjustment between a function that is realized by an application that is installed in the extension app unit 310 and an existing function of the MFP 10. Also, when an event associated with an application that is installed in the extension app unit 310 is generated, the VM/FW unit 309 transmits a corresponding message to the extension app unit 310. The event may be detection, by the UI 302, of a key input on the operation unit 107, or expiration of a timer that the VM/FW unit 309 manages, for example. The VM/FW unit 309 forcibly terminates the application in a case where, for example, there is no response to a message transmitted to the extension app unit 310, or a case in which an abnormality in an application that is installed in the extension app unit 310 is detected.

A UI device controller 311 performs transfer of various information from the UI 302 and the extension app unit 310 to the display unit 105 and transfer to the UI 302 and the extension app unit 310 of information indicating the details of user operations on the operation unit 107.

<Handover Function of Transmission App>

The transmission app 305 transmits image data to an external apparatus (a PC or the like) via the NIC 117. Image data to be transmitted is generated by the scan app 307, for example. The transmission app 305 of the present embodiment has an authentication function (authentication transmission) for authenticating a user that uses the transmission app. The user can set authentication transmission to be ON or OFF by an instruction via the operation unit 107.

The authentication function (authentication transmission) of the transmission app 305 authenticates a user that will use the transmission app 305, by using authentication information inputted via an authentication screen displayed on the display unit 105. If user authentication succeeds based on the inputted authentication information, the transmission app 305 permits usage of the transmission app. After that, the transmission app 305 displays on the display unit 105 a setting screen for setting an image data transmission destination and the like, and receives instructions from the user. The user can set the transmission destination by using an address book saved in the MFP 10 or an external server apparatus. The external server apparatus is an LDAP (Lightweight Directory Access Protocol) server, for example.

The authentication function (authentication transmission) of the transmission app 305 of the present embodiment has a "handover function" for handing over to another authentication process the user-inputted authentication information (user name and password) that was used in authentication of the user that uses the transmission app. Note that the other authentication process is an authentication process for accessing an address book saved in the MFP 10 or an external server apparatus, for example. This handover function can also be used for handover of authentication information from another application such as a login app to the transmission app 305. In the present embodiment, as is described later, the login app uses the handover function that the authentication transmission of the transmission app 305 has for handing over of authentication information to the transmission app 305.

In the case where the handover function is set to OFF, the transmission app 305, in order to access an address book saved in the MFP 10 or an external server apparatus, newly receives input of authentication information from the user, and performs authentication of that user. The transmission app 305, if authentication of the user succeeds, permits access to the address book for the purpose of setting the transmission destination of the image data.

Meanwhile, in the case where the handover function is set to ON, the transmission app 305 hands over, as authentication information for accessing the address book, the authentication information that the user inputted in order to use the transmission app 305, and uses the handed over authentication information. Accordingly, the user need not re-input, for accessing the address book, authentication information that he or she inputted via the authentication screen in order to use the transmission app 305.

Note that, in the present example, the handover function of the transmission app 305 is used for a handover of authentication information to an authentication process for accessing the address book, but limitation is not made to this. For example, the handover function may be used for the handover of authentication information to the authentication process for accessing data (image data or document data or the like) saved in the MFP 10 or an external server.

Figure 3:
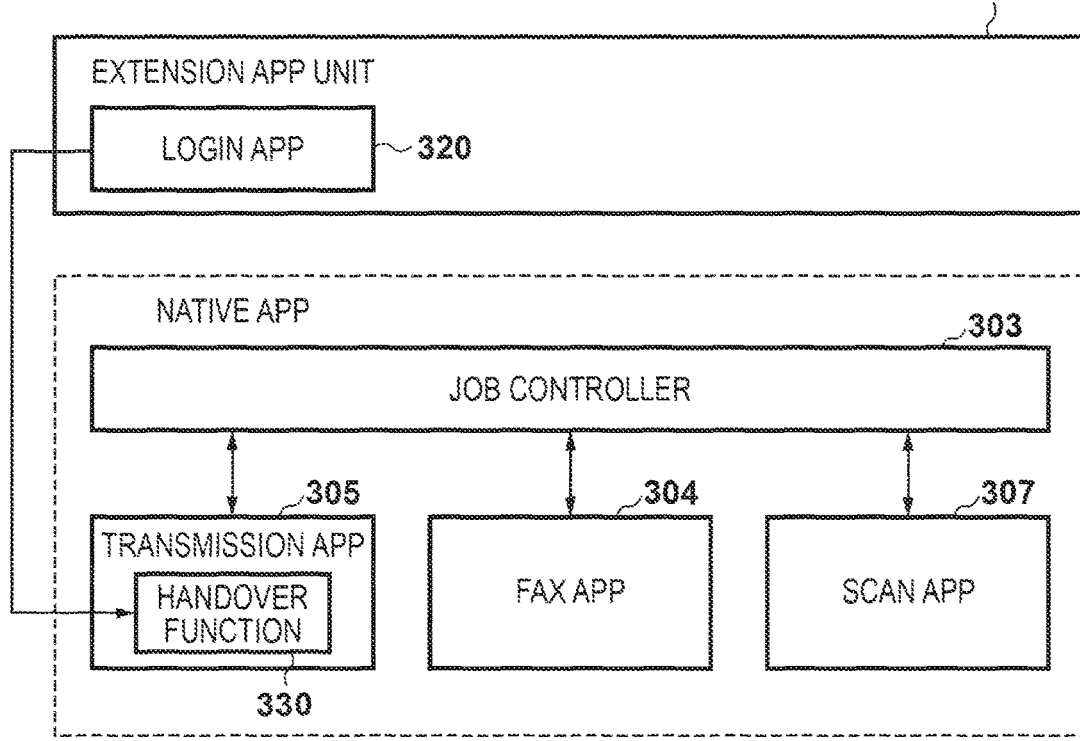
FIG. 3 is a diagram that illustrates an example in which a handover function of a transmission application is used by a login application.

Next, with reference to FIG. 3, processing for using the handover function that the authentication function (authentication transmission) of the transmission app 305 has in order for the login app to hand over authentication information to the transmission app 305 will be described. In a case where a handover function 330 of the transmission app 305 is set to be ON, as illustrated in FIG. 3, use of the handover function 330 by another application including a login app 320 is enabled. In such a case, the login app 320 is enabled to hand over authentication information that was used for user login authentication to the transmission app 305 by using the handover function 330. Accordingly, the transmission app 305 can use the authentication information handed over from the login app 320 in authentication processing for accessing the address book, for example. Specifically, it is possible to perform a handover of the authentication information to the transmission app 305 without implementing an authentication information handover function in the login app 320 for user login authentication.

In the present embodiment, after installation of the login app 320, the handover function 330 of the transmission app 305 is set to ON when the login app 320 is enabled. Accordingly, handover of the authentication information used by the login app 320 to the transmission app 305 by using the handover function 330 is made possible.

Note that in the example of FIG. 3, an example in which the transmission app 305 has a handover function is illustrated, but limitation is not made to this, and apps other than the transmission app 305 (the FAX app 304, for example) may also have a handover function. In such a case, the login app 320 may use the handover function that an app other than the transmission app 305 has for handing over the authentication information to that app.

<Processing for when Enabling Login App>

Figure 4:
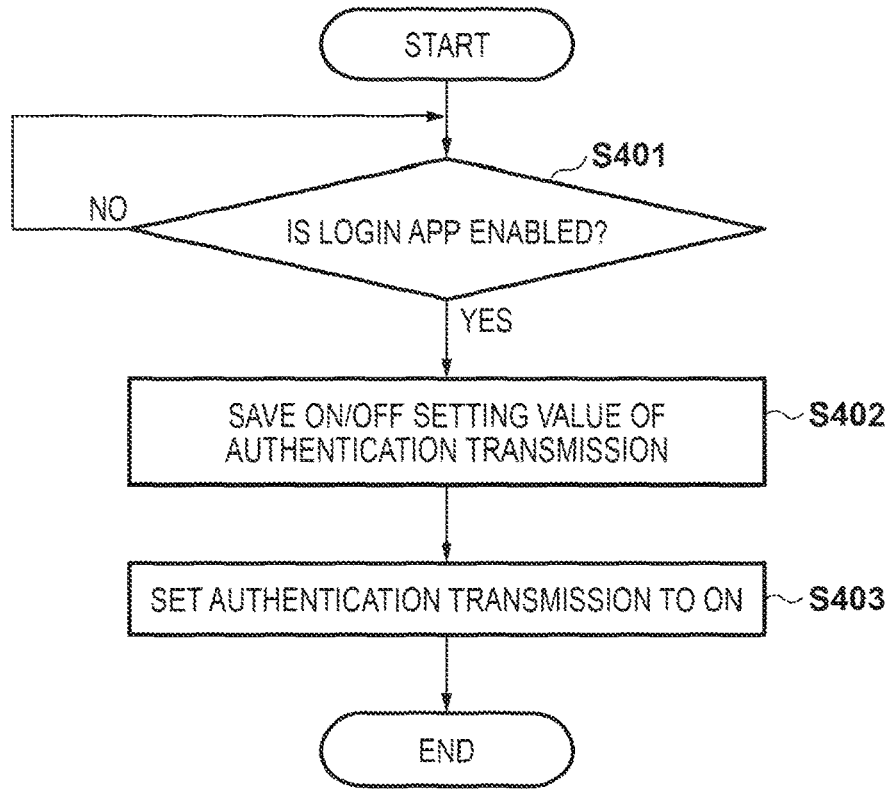
FIG. 4 is a flowchart that illustrates a procedure of setting processing for authentication transmission for when the login application is enabled.

FIG. 4 is a flowchart that illustrates a procedure of setting processing for authentication transmission (an authentication function of the transmission app 305) for when the login app 320 is enabled. The processing of each step of FIG. 4 is realized by the CPU 101 reading a control program stored in the ROM 102 or the eMMC 109 and executing the control program.

First, in step S401, the CPU 101, in accordance with an instruction from the user, determines whether or not to enable the login app 320. If the CPU 101 is instructed by the user to enable the login app 320, the CPU 101 enables the login app 320 and advances the processing to step S402.

If the CPU 101 enables the login app 320, next the CPU 101 in step S402 saves in the eMMC 109 an ON/OFF setting value which is a setting value that indicates the current setting regarding whether the authentication transmission is ON or OFF prior to setting the authentication transmission to ON. This ON/OFF setting value indicates whether the authentication transmission is set to ON or set to OFF.

The ON/OFF setting value saved in the eMMC 109 in step S402, as described later, is used when the login app 320 is disabled. Specifically, if the CPU 101 disables the login app 320, the CPU 101, by setting the authentication transmission to be ON or OFF based on the setting value saved in the eMMC 109, returns the setting of whether the authentication transmission is ON or OFF to the setting prior to the login app 320 being enabled (step S504 to step S506 of FIG. 5).

After that, the CPU 101, in step S403, sets the authentication transmission to ON. Here, in the case where the authentication transmission is set to ON, that setting is maintained, and in the case where the authentication transmission is set to OFF, the setting is changed from OFF to ON. The CPU 101 terminates the processing when the authentication transmission setting completes.

By the foregoing processing, it is possible to set the authentication transmission (authentication function) of the transmission app 305 which has the handover function 330 to ON when the login app 320 is enabled. As a result, even if the login app 320 does not have a handover function for handing over the authentication information to another application, a handover of authentication information to the transmission app 305 is made possible by using the handover function 330 that the transmission app 305 has.

<Processing for when Disabling Login App>

Figure 5:
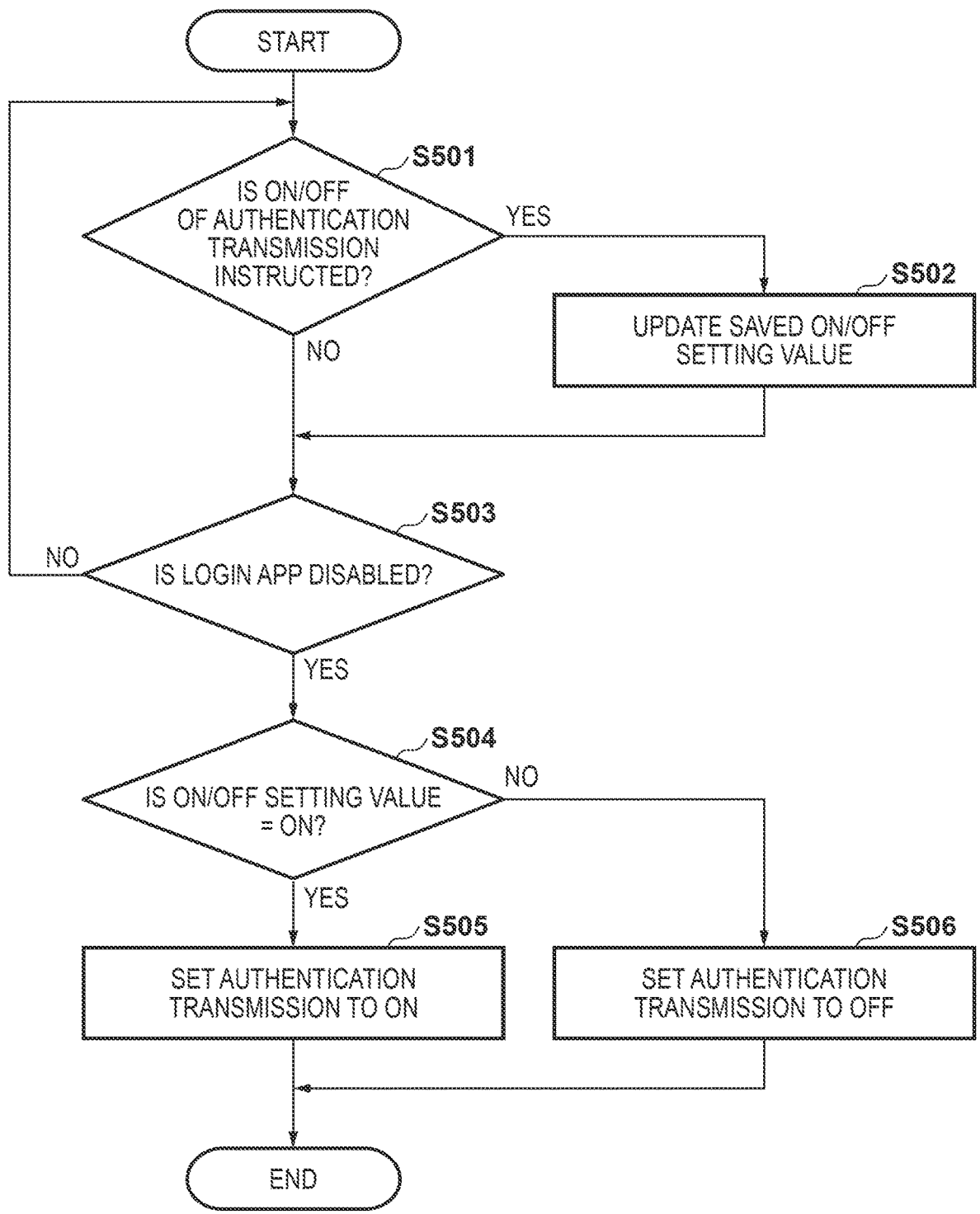
FIG. 5 is a flowchart that illustrates a procedure of setting processing for authentication transmission for when the login application is disabled.

FIG. 5 is a flowchart that illustrates a procedure of setting processing for authentication transmission (an authentication function of the transmission app 305) for when the login app 320 is disabled. The processing of each step of FIG. 5 is realized by the CPU 101 reading a control program stored in the ROM 102 or the eMMC 109 and executing the control program.

In steps S501 to S503, if ON/OFF of authentication transmission of the transmission app 305 is instructed by the user prior to the login app 320 being disabled, processing for updating the ON/OFF setting value saved in the eMMC 109 is performed. However, even if the authentication transmission is instructed to be turned OFF, setting of the authentication transmission up until the login app 320 is disabled is kept ON so that a handover of authentication information from the login app 320 to the transmission app 305 does not become impossible.

Specifically, in step S501, the CPU 101 determines whether or not the user instructed that the authentication transmission of the transmission app 305 be turned ON/OFF, the CPU 101 advances the processing to step S502 in the case where such an instruction was made, and advances the processing to step S503 in the case where such an instruction was not made. In step S502, the CPU 101, based on the instruction by the user, updates the ON/OFF setting value of the authentication transmission saved in the eMMC 109. Specifically, in the case where the authentication transmission is instructed to be turned ON, a value indicating ON is saved as the ON/OFF setting value, and in a case where the authentication transmission is instructed to be OFF, a value indicating OFF is saved as the ON/OFF setting value. After that, the CPU 101 advances the processing to step S503.

In step S503, the CPU 101, in accordance with an instruction from the user, determines whether or not to disable the login app 320. The CPU 101, in a case where disabling of the login app 320 is not instructed by the user, returns the processing to step S501, and in a case where disabling of the login app 320 is instructed, the CPU 101 disables the login app 320, and advances the processing to step S504.

In step S504, the CPU 101 determines whether or not the ON/OFF setting value of the authentication transmission saved in the eMMC 109 indicates ON, and in the case of the value indicating ON, the CPU 101 advances the processing to step S505, and in a case of the value indicating OFF, the CPU 101 advances the processing to step S506. In step S505, the CPU 101 sets the authentication transmission of the transmission app 305 to ON. Meanwhile, in step S506, the CPU 101 sets the authentication transmission of the transmission app 305 to OFF. After that, the CPU 101 terminates the processing.

By the foregoing processing, the CPU 101, when disabling the login app 320, sets the authentication transmission of the transmission app 305 to be ON or OFF based on the ON/OFF setting value saved in the eMMC 109. Accordingly, setting as to whether the authentication transmission is ON or OFF can be returned to the setting prior to the login app 320 being enabled. However, in the case where, while the login app 320 is enabled, the authentication transmission is instructed to be turned ON/OFF, it is possible to reflect a user instruction in the setting as to whether the authentication transmission is ON or OFF after the login app 320 has been disabled.

<User Authentication Processing>

Figure 6:
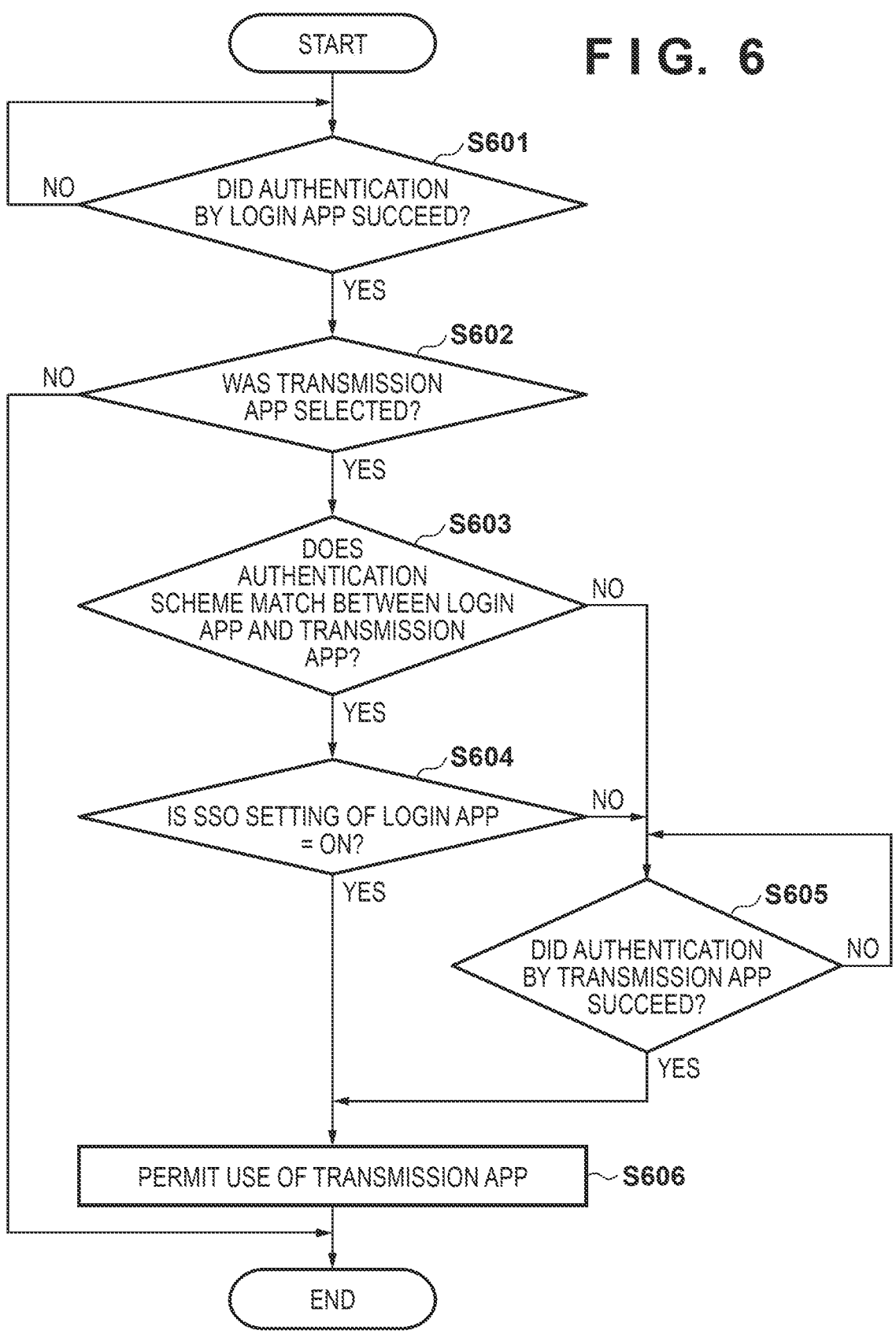
FIG. 6 is a flowchart that illustrates a procedure of a user authentication processing for a case in which the transmission application is used while the login application is enabled.

FIG. 6 is a flowchart indicating the procedure of user authentication processing in the case where the transmission app 305 is used while the login app 320 is enabled. The processing of each step of FIG. 6 is realized by the CPU 101 reading a control program stored in the ROM 102 or the eMMC 109 and executing the control program.

First, in step S601, the CPU 101 performs user login authentication by the login app 320, and determines whether or not the login authentication succeeded. If the login authentication succeeds, the CPU 101 advances the processing to step S602. In step S602, the CPU 101 determines whether or not the transmission app 305 was selected via an operation screen displayed on the display unit 105. The CPU 101 terminates the processing in a case where the transmission app 305 was not selected, and advances the processing to step S603 in the case where the transmission app 305 was selected.

In step S603, the CPU 101 determines whether or not an authentication scheme that the login app 320 uses matches an authentication scheme that the transmission app 305 uses, and if they match, the CPU 101 advances the processing to step S604, and if they do not match, the CPU 101 advances the processing to step S605. For example, in the case where both the login app 320 and the transmission app 305 are using the LDAP authentication, the CPU 101 advances the processing to step S604. In step S604, the CPU 101 determines whether or not a single-sign-on setting (SSO setting) has been made in relation to the login app 320 (whether or not an SSO setting is ON). The CPU 101, in a case where the SSO setting has not been made, advances the processing to step S605, and in the case where the SSO setting has been made, advances the processing to step S606.

In the case of advancing the processing from step S604 to step S606, the CPU 101 (the login app 320) hands over the authentication information used by the login app 320 to the transmission app 305 by using the handover function 330 of the transmission app 305. In the present embodiment, the CPU 101 (the login app 320), in accordance with the authentication scheme that the login app 320 uses being the same as the authentication scheme that the transmission app 305 uses, hands over the authentication information to the transmission app 305 by using the handover function 330. Furthermore, the CPU 101 (the login app 320), in accordance with the SSO setting of the login app 320 being ON, hands over the authentication information to the transmission app 305 by using the handover function 330.

In this way, in the case where the authentication information is handed over from the login app 320, the CPU 101 (the transmission app 305), in step S606, based on the handed over authentication information, omits authentication of the user that will use the transmission app 305, and permits usage of the transmission app 305. Specifically, the CPU 101 (the transmission app 305), without prompting the user to input authentication information (for example, user name and password) by displaying an authentication screen on the display unit 105, permits the user to use the transmission app 305 based on the handed over authentication information. For example, the CPU 101 (the transmission app 305) permits access, for setting of the transmission destination of the image data, to an address book that is saved on the MFP 10 or an external server apparatus (an LDAP server or the like) in association with the user. After that, the CPU 101 terminates the processing.

Meanwhile, in the case where the processing advances from step S603 or step S604 to step S605, the CPU 101, in step S605, performs user authentication by the transmission app 305, and determines whether or not the authentication succeeded. The CPU 101, in the case where the authentication failed, repeats the processing of step S605, and in the case where the authentication succeeded, advances the processing to step S606. In step S606, the CPU 101 permits the user to use the transmission app 305, and then terminates the processing.

By the foregoing processing, if the authentication scheme matches between the login app 320 and the transmission app 305, and an SSO setting is made in relation to the login app 320, the user can use the transmission app 305 without inputting the authentication information twice. Specifically, it becomes possible to omit the effort of the user inputting the authentication information twice in order to use the transmission app 305.

As described above, in the present embodiment, the CPU 101 enables the login app 320 (first application) that authenticates a user that logs into the MFP 10, and performs a setting of an authentication function (authentication transmission) of the transmission app 305 (second application). The CPU 101, as a setting for the transmission app 305, sets the authentication function to be ON or OFF. This authentication function has the handover function 330 for receiving authentication information, used in authentication by another application, that is handed over from the other application, and using the handed over authentication information. If the login app 320 is enabled, the CPU 101, by setting the authentication function of the transmission app 305 to be ON, enables handover of authentication information used by the login app 320 to the transmission app 305 in accordance with the handover function 330.

By virtue of the present embodiment, it becomes possible to perform a handover of authentication information to the transmission app 305 without implementing an authentication information handover function in the login app 320 that is additionally installed in the MFP 10. Also, in the present embodiment, it becomes possible to omit the effort of a user inputting authentication information twice by the transmission app 305 permitting the user to use the transmission app 305 based on authentication information handed over from the login app 320.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-104945, filed May 26, 2017, which is hereby incorporated by reference herein in its entirety.

What is claimed is:

1. An image processing apparatus comprising:
a memory device that stores a set of instructions; and
at least one processor that executes the set of instructions to:
enable a first application configured to authenticate a user who logs into the image processing apparatus; and
perform, as a setting corresponding to a second application configured to transmit image data to an external apparatus, an ON or OFF setting of an authentication function for authenticating a user who uses the second application, the authentication function having a handover function for receiving authentication information, used for authentication by another application, that is handed over from the another application and then using the handed over authentication information,
wherein the at least one processor executes instructions in the memory device to, by setting the authentication function to ON in accordance with the first application being enabled, enable handover by the handover function of the authentication information used by the first application to the second application, and wherein the at least one processor executes instructions in the memory device to, by setting the authentication function to OFF, not enable handover by the handover function of the authentication information used by the first application to the second application.

2. The image processing apparatus according to claim 1, wherein the first application, in a case where authentication of a user succeeds, hands over the authentication information of the user to the second application by using the handover function, and the second application, based on the authentication information handed over from the first application, permits the user to use the second application.

3. The image processing apparatus according to claim 2, wherein the second application, based on the authentication information handed over from the first application, permits access, for setting of a transmission destination of the image data, to an address book saved on the image processing apparatus or an external server apparatus in association with the user.

4. The image processing apparatus according to claim 1, wherein the second application, based on the authentication information handed over from the first application, omits authentication of the user that uses the second application.

5. The image processing apparatus according to claim 1, wherein the first application, in accordance with an authentication scheme of the first application and an authentication scheme of the second application being the same, hands over the authentication information to the second application by using the handover function.

6. The image processing apparatus according to claim 1, wherein the first application, in accordance with a single sign-on setting being performed in relation to the first application, hands over the authentication information to the second application by using the handover function.

7. The image processing apparatus according to claim 1, wherein the at least one processor further executes instructions in the memory device to, in a case where the first application is disabled, return the ON or OFF setting of the authentication function to a setting prior to the first application being enabled.

8. The image processing apparatus according to claim 1, wherein the at least one processor executes instructions in the memory device to:

in a case where the first application is enabled, prior to the authentication function being set to ON, save a setting value indicating a current setting for whether the authentication function is ON or OFF; and in a case where the first application is disabled, perform the ON or OFF setting of the authentication function based on the saved setting value.

9. The image processing apparatus according to claim 1, wherein the second application is an application that is installed in advance on the image processing apparatus, and the first application is an application that is installed additionally on the image processing apparatus.

10. The image processing apparatus according to claim 1, wherein the first application is a login application, and the second application is a transmission application.

11. A method of controlling an image processing apparatus, the method comprising:

enabling a first application configured to authenticate a user who logs into the image processing apparatus; and performing, as a setting corresponding to a second application configured to transmit image data to an external apparatus, an ON or OFF setting of an authentication function for authenticating a user who uses the second application, the authentication function having a handover function for receiving authentication information, used for authentication by another application, that is handed over from the another application and then using the handed over authentication information, wherein in the setting, by setting the authentication function to ON in accordance with the first application being enabled, handover by the handover function of the authentication information used by the first application to the second application is enabled, and wherein, in the setting, by setting the authentication function to OFF in accordance with the first application being enabled, not enable handover by the handover function of the authentication information used by the first application to the second application.

12. A non-transitory computer-readable storage medium storing a computer program for causing a computer to execute a method of controlling an image processing apparatus, the method comprising:

enabling a first application configured to authenticate a user who logs into the image processing apparatus; and performing, as a setting corresponding to a second application configured to transmit image data to an external apparatus, an ON or OFF setting of an authentication function for authenticating a user who uses the second application, the authentication function having a handover function for receiving authentication information, used for authentication by another application, that is handed over from the another application and then using the handed over authentication information, wherein in the setting, by setting the authentication function to ON in accordance with the first application being enabled, handover by the handover function of the authentication information used by the first application to the second application is enabled, and wherein, in the setting, by setting the authentication function to OFF in accordance with the first application being enabled, not enable handover by the handover function of the authentication information used by the first application to the second application.

13. An image processing apparatus comprising:

a memory device that stores a set of instructions; and at least one processor that executes the set of instructions to:

in accordance with a first application that has a function for performing authentication by using authentication information of a user who logs into the image processing apparatus being enabled, permit the first application to use the handover function of a second application that has a handover function for handing over authentication information between different applications;

hand over the authentication information used in authentication by the first application, from the first application to the second application by using the handover function; and perform the second application based on the hand over authentication information.

14. The image processing apparatus according to claim 13, wherein the first application is a login application, and the second application is a transmission application.

15. A method of controlling an image processing apparatus that includes a first application that has a function for perform authentication by using authentication information of a user who logs into the image processing apparatus, and a second application that has a handover function for handing over authentication information between different applications, the method comprising:

in accordance with the first application being enabled, permitting the first application to use the handover function of the second application; and handing over the authentication information used in authentication by the first application, from the first application to the second application by using the handover function; and performing the second application based on the hand over authentication information.

* * * * *